(12) United States Patent
Torabifard et al.

(10) Patent No.: US 9,677,739 B2
(45) Date of Patent: Jun. 13, 2017

(54) ASYMMETRICAL V-SHAPE DIFFUSER FOR NON-WHITE LED FIXTURES

(71) Applicant: GE Lighting Solutions, LLC, East Cleveland, OH (US)

(72) Inventors: Mozhgan Torabifard, Lachine (CA); David Wan Fong, Lachine (CA)

(73) Assignee: GE LIGHTING SOLUTIONS, LLC, East Cleveland, OH (US)

( * ) Notice: Subject to any disclaimer, the term of this patent is extended or adjusted under 35 U.S.C. 154(b) by 388 days.

(21) Appl. No.: 14/224,117

(22) Filed: Mar. 25, 2014

(65) Prior Publication Data

US 2015/0276167 A1 Oct. 1, 2015

(51) Int. Cl.
| | |
|---|---|
| *F21V 5/04* | (2006.01) |
| *G02B 5/02* | (2006.01) |
| *F21V 29/503* | (2015.01) |
| *F21V 7/00* | (2006.01) |
| *F21V 13/04* | (2006.01) |
| *F21S 8/02* | (2006.01) |
| *F21V 3/02* | (2006.01) |
| *F21Y 115/10* | (2016.01) |
| *F21Y 113/10* | (2016.01) |
| *F21Y 113/13* | (2016.01) |
| *F21Y 113/17* | (2016.01) |

(52) U.S. Cl.
CPC ............ *F21V 5/04* (2013.01); *F21S 8/026* (2013.01); *F21V 3/02* (2013.01); *F21V 7/00* (2013.01); *F21V 7/0008* (2013.01); *F21V 13/04* (2013.01); *F21V 29/503* (2015.01); *G02B 5/0257* (2013.01); *G02B 5/0278* (2013.01); *F21Y 2113/10* (2016.08); *F21Y 2113/13* (2016.08); *F21Y 2113/17* (2016.08); *F21Y 2115/10* (2016.08)

(58) Field of Classification Search
CPC ... F21V 5/04; F21V 7/00; F21V 13/04; G02B 5/0257; G02B 5/0278; F21Y 2113/002; F21Y 2113/005; F21Y 2113/007; F21Y 2101/02; F21K 9/50
See application file for complete search history.

(56) References Cited

U.S. PATENT DOCUMENTS

| | | |
|---|---|---|
| 2012/0051041 A1 | 3/2012 | Edmond et al. |
| 2012/0140461 A1 | 6/2012 | Pickard |

OTHER PUBLICATIONS

A European Search Report and Opinion issued in connection with corresponding Application No. 15159552.7 on Aug. 19, 2015.

*Primary Examiner* — Thomas M Sember
(74) *Attorney, Agent, or Firm* — GE Global Patent Operation; Peter T. DiMauro

(57) ABSTRACT

Provided is an optical diffuser apparatus, for use adjacent a light engine in a lighting fixture for producing desired color-mixed light output. The apparatus includes a first diffuser panel and a second diffuser panel connected to the first diffuser panel. The first diffuser panel and the second diffuser panel are configured and arranged so that, when the apparatus is positioned for operation within the fixture, light emitted by the light engine at greater than a pre-determined threshold angle with respect to a centerline of the engine will pass through both the first diffuser panel and the second diffuser panel, thereby mixing colors of the light toward the desired color-mixed light output.

17 Claims, 4 Drawing Sheets

ASYMMETRICAL V-SHAPE DIFFUSER FOR NON-WHITE LED FIXTURES

I. TECHNICAL FIELD

The present invention relates generally to optical fixtures. More particularly, the present invention relates to an asymmetrical, generally v-shaped, diffuser apparatus for use in an optical fixture.

II. BACKGROUND

Light fixtures are being designed increasingly to include solid-state lighting (SSL), and particularly non-white light-emitting diodes (LEDs), due in large part to the increased efficiency they provide, and at a relatively-high color rendering index (CRI). CRI is a quantitative measure of an ability of light fixture to reproduce the colors of various objects faithfully in comparison with an ideal or natural light source.

With non-white LEDs, significant color mixing is desired to increase CRI and avoid unwanted color spotting from separate color photometric sources. In light fixtures of all types, an optical diffuser is sometimes used to spread out, or scatter, light before the light is emitted from the fixture, resulting in a softer resulting light. Example diffusers include reflectors and lenses.

Using a light fixture employing an indirect configuration, by which light is reflected within the fixture before being emitted by the fixture, is one of the best ways to mix light.

These fixtures include a form of cavity in which light is mixed. The cavity includes, a reflective surface, which can be a diffusive reflector and a light source—e.g., a single-sided light source emitting light toward the reflective surface.

Turning to the figures, and more particularly the first figure, FIG. 1 shows a perspective view of an example reflective, or indirect light or optical fixture 100. The light fixture 100 includes a light engine or source 102, such as an LED board. The engine 102 may include or be connected directly to a heat sink (not shown in detail in FIG. 1). A heat sink is typically required for SSL sources, which are unable to dissipate heat sufficiently on their own.

The light fixture 100 also includes a reflector cover 104 having a reflective surface 106. The fixture 100 may also include a cap or housing 108.

In many fixtures, the light source 102 is positioned is positioned central to two reflector cover portions 104A, 1048, as shown in FIG. 1. In operation, light emitted by the light engine 102 is reflected at the surface(s) 106.

The light source 102 in such indirect lighting fixtures is typically a 0°-180° source, and usually a Lambertian-type light source, whereby the light is emitted generally upward from the source, e.g., between 0°-180°—and so having a vertically upward vector —to impinge on the reflector 104, and reflect from the surface 106 generally downward to outside of the fixture 100.

A common type of indirect lighting fixture is a troffer-type light fixture. While this type of fixture has typically been designed to accommodate standard fluorescent lamps (e.g., T12, T8, T5 format fluorescent lamps), it is being designed increasingly for SSL, including, primarily, LEDs. Troffer light fixtures are the most common lighting fixture used in commercial office spaces, schools, retail, and lab facilities. They are sometimes implemented within a ceiling surface-mount box, but are usually fit mounted about a ceiling recess or plenum that receives portions of the fixture extending above a ceiling plane. Troffers are typically rectangular (elongated or square), but can be round or oval, and are categorized commercially by their size. Example sizes for rectangular troffers include two-by-four (2' by 4', or 2×4), two-by-two (2' by 2', or 2×2), one-by-four (1' by 4', or 1×4), one-by-six (1' by 6', or 1×6), and four-by-four (4' by 4', or 4×4).

Design goals include providing light of desired strength and quality, such as color—e.g., a soft clear or white light from all angles at which light is emitted from the fixture 100. Traditional indirect lighting fixtures do not provide sufficient color mixing, but are much better than direct and edge-lit light fixtures.

Less than desirable performance of all traditional light fixtures results largely from insufficient diffusion, or insufficient color mixing. Unwanted color separation produces light in which one or more colors are visible undesirably, such as any non-white color being visible when white, or colorless, light output is desired.

The undesirable light characteristics are present commonly in light fixtures using non-white SSLs, such as a blue-shifted-yellow plus red (BSY+R) LED. For some traditional fixtures, undesirable light characteristics have been found present especially in connection with rays arriving at an intra-fixture diffuser at relatively high incident angles.

III. SUMMARY OF THE EMBODIMENTS

Given the aforementioned deficiencies, there is a need for a diffuser arrangement configured and arranged for use in light fixtures to emit light having desired light qualities, especially light being sufficiently color mixed.

In at least one embodiment, the present invention provides an optical diffuser apparatus, for use adjacent a light engine in a lighting fixture for producing desired color-mixed light output. The apparatus includes a first diffuser panel and a second diffuser panel connected to the first diffuser panel. The first diffuser panel and the second diffuser panel are configured and arranged so that, when the apparatus is positioned for operation within the fixture, light emitted by the light engine at greater than a pre-determined threshold angle with respect to a centerline of the engine will pass through both the first diffuser panel and the second diffuser panel thereby mixing colors of the light toward the desired color-mixed light output.

Further features and advantages, as well as the structure and operation of various embodiments are described in detail below with reference to the accompanying drawings. The invention is not limited to the specific embodiments described herein. The embodiments are presented for illustrative purposes only. Additional embodiments will be apparent to persons skilled in the relevant art(s) based on the teachings contained herein.

IV. BRIEF DESCRIPTION OF THE DRAWINGS

Example embodiments may take form in various components and arrangements of components. Example embodiments are illustrated in the accompanying drawings, throughout which like reference numerals may indicate corresponding or similar parts in the various figures.

The drawings are only for purposes of illustrating preferred embodiments and are not to be construed as limiting the invention. Given the following enabling description of the drawings, novel aspects of the present invention will be evident to a person of ordinary skill in the art.

V. DETAILED DESCRIPTION OF THE EMBODIMENTS

While illustrative embodiments are described herein with illustrative embodiments for particular implementations, it should be understood that the invention is not limited thereto. Those skilled in the art with access to the teachings provided herein will recognize additional modifications, applications, and embodiments within the scope thereof, and additional fields in which the lighting systems described herein would be of significant utility.

As described, light leaving conventional diffusers, in conventional lighting fixtures, has undesirable lighting characteristics resulting from insufficient diffusion, or color mixing. The unwanted color separation produces light in which one or more colors are visible undesirably, such as any non-white color being visible when white, or colorless, light output is desired. For some traditional fixtures, the undesirable light characteristics are present especially in rays having arrived at the diffuser at relatively high incident angles, as described in more detail below.

One technique to address the afore-mentioned problems includes providing a blocker, e.g., skirt, in the lighting fixture to block light having insufficient color mixing from leaving the fixture. In one embodiment, the blocker is configured and arranged in the fixture to block light leaving the light source at high angles. From devices employing this blocking technique, though, an undesirable, color-contrasting, pattern is still visible.

Another approach includes arranging the fixture so that the light source is closer to the reflector, thereby keeping, based on the distances and angles within the fixture, light leaving the source at high angles from leaving the fixture. In both techniques, an undesirably high amount of efficiency is lost, as less than all of the light produced by the light source is output by the fixture.

Another technique, being the primary focus of the present disclosure, to address at least the afore-mentioned concerns, includes using a two part optical diffuser, such as an asymmetrical v-shaped diffuser. The two-part diffuser is configured and arranged to diffuse, twice, select rays from the light source, therein color mixing the light sufficiently.

Figure 2:
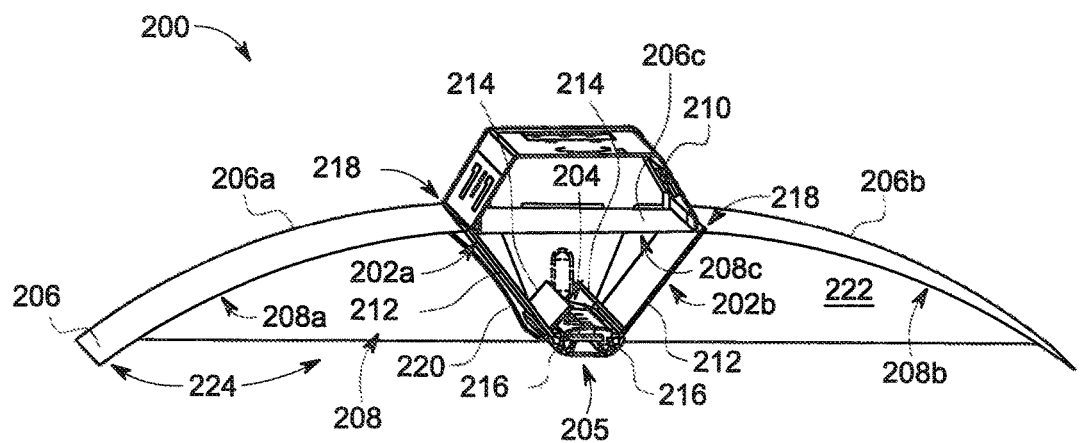
FIG. 2 is a perspective cut-away vie of an example light fixture including a diffuser apparatus according to, embodiments of the present technology.

Lighting System Overview—FIG. 2

Turning again to the figures, FIG. 2 is a perspective cut-away view of an example light fixture 200 including a diffuser apparatus 202A, 202B, according to embodiments of the present technology. The illustrated fixture 200 includes two diffuser apparatuses 202A, 202B.

Figure 1:
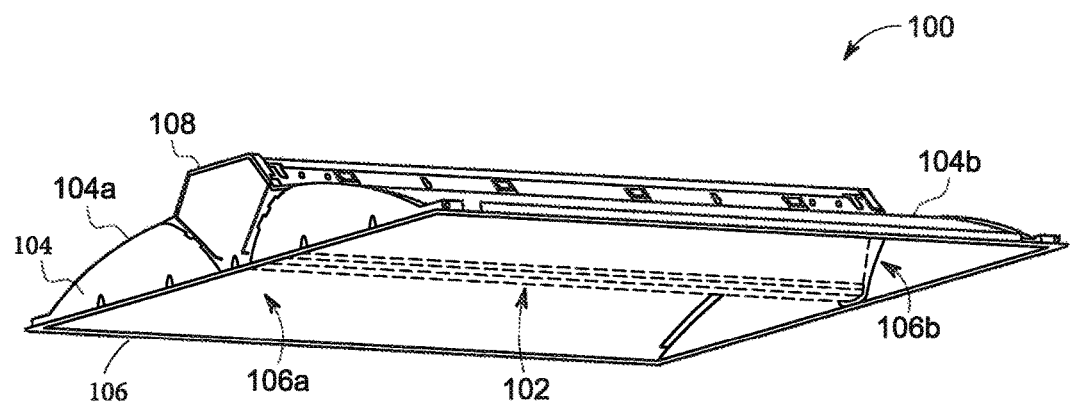
FIG. 1 is a perspective view of an example reflective, or indirect light fixture.

As with the fixture 100 of FIG. 1, the light fixture 200 includes a light engine or source 204, such as an LED board. The engine 204 may include or be connected directly to a heat sink 205, as mentioned.

In some implementations, the engine 204 includes a non-white LED light source, such as a blue-shifted yellow plus red (BSY+R) LED light engine. The diffuser apparatuses 202A, 202B described herein manipulate light from such LED, or other non-white SSL, sources, for instance, to output light of desired strength and quality. The desired strength and quality can include, e.g., soft clear or white light from all angles at which light is emitted from the fixture 100.

The fixture 200 also includes a reflector cover 206 having a reflective surface 208. In operation, at least some of the light emitted by the light engine 204 (e.g., non-white LED source) impinges on and is reflected by the reflective surface 208 of the cover 206.

The reflective surface 208 may comprise any of a variety of materials. It is desirable, for many indoor lighting applications, to present a uniform soft light sans unpleasant glare, color striping, or hot spots. The surface 208 in some embodiments includes a diffuse white reflector, such as a microcellular polyethylene terephthalate (MCPET) material.

The reflector cover 206 of FIG. 2 is illustrated by way of example and not limitation. The cover 206 is not limited, for instance, to the configuration (e.g., shape, size, relative intra-component sizing) and arrangement (e.g., positioning, intra-component orientations) shown. In one embodiment, the cover 206 includes a single piece across the fixture 200, wherein the portions 208A, 208B, 208C called out separately in the figure are formed integrally.

In another embodiment, one or more of the cover 206 portions 208A, B, C are formed separately from and positioned, in assembling the fixture 200, adjacent the other portion(s) contiguously across the fixture. In a particular embodiment, for instance, the end or lateral portions 206A, B are formed together, integrally, while the middle portion 206C is formed separately and connected to the lateral portions 206A, B.

Figure 3:
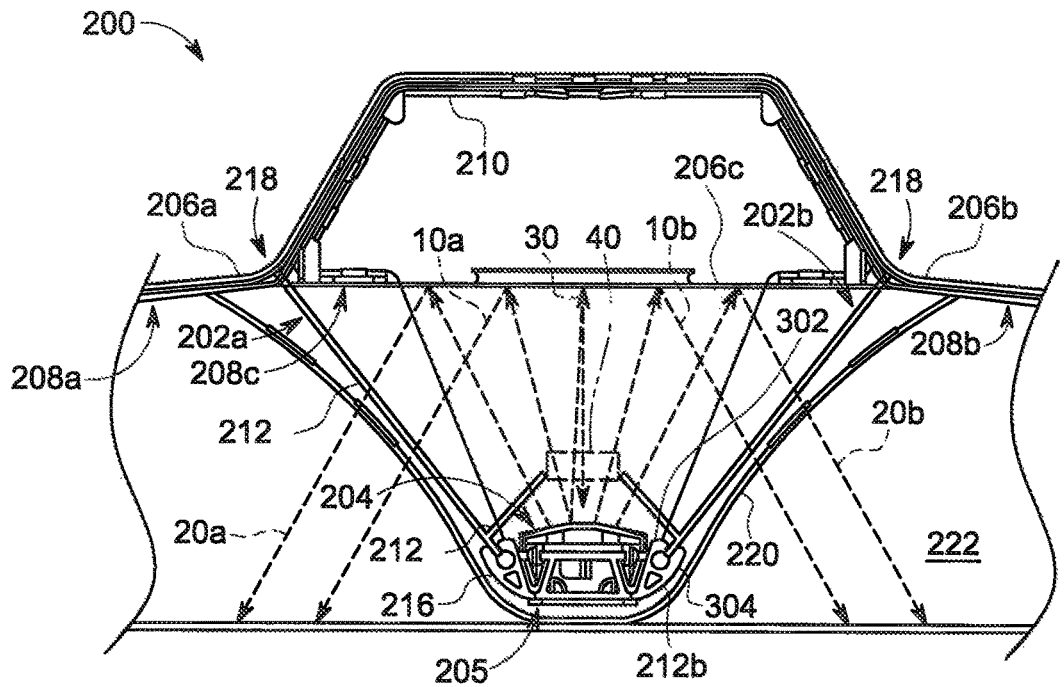
FIG. 3 is a close-up side cut-away view of the light fixture and diffuser apparatus of FIG. 2.

The cover portions 206A, 206B may form all or part of a cap or housing 210, as shown more clearly in FIG. 3. The housing 210 can perform functions such as protecting at least the central reflector 204C, encasing fixture wiring and facilitating fixture cooling.

A focus of the present technology is the intra-fixture diffuser apparatus 202A, 202B. While the curved reflector 206 creates a cavity, adding the diffuser apparatus 202A, 202B can be said to form a desired cavity, or preferred cavity configuration, for achieving the desired benefits specified herein. As referenced above and described in more detail below, the benefits resulting from use of the present cavity configuration include maximizing light output of the fixture 200 (e.g., maximizing overall efficiency) while minimizing unwanted color separation.

In the example of FIGS. 2-6, each of two diffuser apparatuses 202A, 202B includes a first portion or part 212 (e.g., panel) and a second portion or part 214 (e.g., panel) connected to the first. The apparatuses 202A, 202B are asymmetric and generally v-shaped, or checkmark shaped. This example shape is shown more clearly in the perspective view of the diffuser apparatus 202A, 202B in FIG. 5 and by profile in FIG. 6.

Each diffuser apparatus 202A, 202B is not limited to the configuration (e.g., shape, size, relative intra-fixture sizing) and arrangement (e.g., intra-fixture positioning and orientation, intra-apparatus positioning and orientation) shown. In a contemplated embodiment, the diffusers 202A, 202B are not identical, differing, e.g., in terms of size, shape, material, configuration, and arrangement (intra-lighting-fixture and/or intra-diffuser-apparatus relative positioning).

The diffuser apparatuses 202A, 202B can be secured in place in any of a wide variety of ways without departing from the scope of the present technology. Possible manners of securement include thermal paste or adhesive. In the illustrated example, the light fixture includes a mount 216 receiving a first end of the diffuser apparatus 202A, 202B (e.g., a first, or lower, end of a first panel 212) and a reflector receiving area 218 receiving a second end of the diffuser apparatus 202A, 202B (e.g., a second end, or upper of the first panel 212). These features are shown and described in more detail in connection with FIG. 3.

As an aside, directional indications provided herein are not provided to limit application of the present technology. References herein—to up or down, for instance, or horizontal, or vertical, or upper, or lower, or lateral—provided in connection diffuser or fixture configuration or arrangement, for instance, do not limit the technology to being used in any particular orientation. For example, a reference to output light being provided down and out of the fixture 200 does not limit the fixture from being used solely, in a way whereby light is providing straight down. The fixture could be arranged to provide light, at an angle, such as by being positioned at an upper corner of a room, at a 45° angle. Or the fixture could be provided, still on a wall, providing most or at least some of its light generally horizontally in an environment, or earth, reference frame. The fixture could even be arranged, such as on or adjacent a floor, to provide at least some of its light upwards.

The configuration and arrangement of each diffuser apparatus' 202A, 202B can be set, e.g., by a designer of the apparatus or of the entire fixture 200, in any of a variety of ways depending on factors related to a particular implementation, such as features of the LED or other light source, trajectory of light rays leaving the source, other features of the fixture 200, desired quality or strength of output light, the like, and other. These and other variables, considerations, or factors for configuring and arranging the diffuser apparatus 202A 202B of the present technology are described further below, including in connection with FIG. 2.

The design process including creation and/or use of a customized software package for use in the same, is described further below, including in connection with FIG. 7.

The resulting diffuser apparatus 202A, 202B can be formed in any of a variety of ways. In one embodiment the apparatus 202A, 202B is formed in a single process. The two illustrated panels 216, 218 of each diffuser apparatus 202A, 202B can be formed together in a single process, or formed separately and joined.

In another embodiment, the first portion the two or more diffuser apparatus parts is pre-existing, such as the first, larger, part 212 in FIGS. 2-6, and configured for a pre-existing light fixture design. The process may be referred to as a retrofitting process or method. The first part 212 may have been made otherwise by a pre-existing manufacturing, even if not used already in a light fixture. In this embodiment, the second part 214 is added adjacent or by direct connection to the first part 212.

One of the benefits of the present diffuser technology is that it can be easily implemented. Existing fixture design can be used without change, or with little modification. In this way, cost can be saved at least in part by making use of existing infrastructure and existing or ordered materials, for instance. In some embodiments, for instance, a pre-existing light fixture, configured and arranged for a first type of light source, such as a white-light source, or a fluorescent light source, can be reconfigured easily to include the present diffuser apparatus 202A, 202B, e.g., with minimum or substantially no other changes to the fixture. The modified fixture can thereby accommodate a non-white LED light source, such as a BSY+R LED light engine and produce desired high-quality light.

The pre-existing first part, e.g., part 212, is in one implementation configured (e.g., sized and shaped) to be secured in place in a pre-existing light fixture, such as secured in place using the illustrated mount 216 and the reflector-side receiving area 218. The pre-existing fixture in this case could be configured so that there is space for accommodating the second diffuser part—e.g., the smaller part 214. In connection with this embodiment, FIGS. 2 and 3 would be showing, then, the fixture 200 after the second diffuser part 214 has been added, most particularly after the second part 214 has been connected to the first part 212.

In a particular embodiment, the first part 212 of each diffuser apparatus 202A, 202B is removed from the fixture 200, connected to the second part 214, and returned with the second part to its place within the fixture 200. In another particular embodiment, the first and second parts 212, 214 are joined and the first part is then introduced, with the second part, and for a first time, to its secure position within the fixture 200.

While both diffuser parts 212, 214 are shown as being generally rectangular, generally flat, and the first is shown as being larger, or longer, and the second, added, part as smaller, or shorter in the illustrated example, one or both the parts can have various shapes and sizes, and still satisfy the goals described herein, as described further below.

Ancillary components of the light fixture 200 with respect to the present teachings include a wire harness or other structure 220 forming an inverted trough or support for the light engine 202A, 202B. Ancillary components also include a distal side or end 222 of the fixture. Many ancillary components of the light fixture 200 are not shown in detail. The fixture 200 may include, for instance, at or adjacent the areas called out by reference numeral 224, trim or frame components, fixture mounting components, a lens or other additional diffuser, and/or one or more baffles or other optical components.

Figure 4:
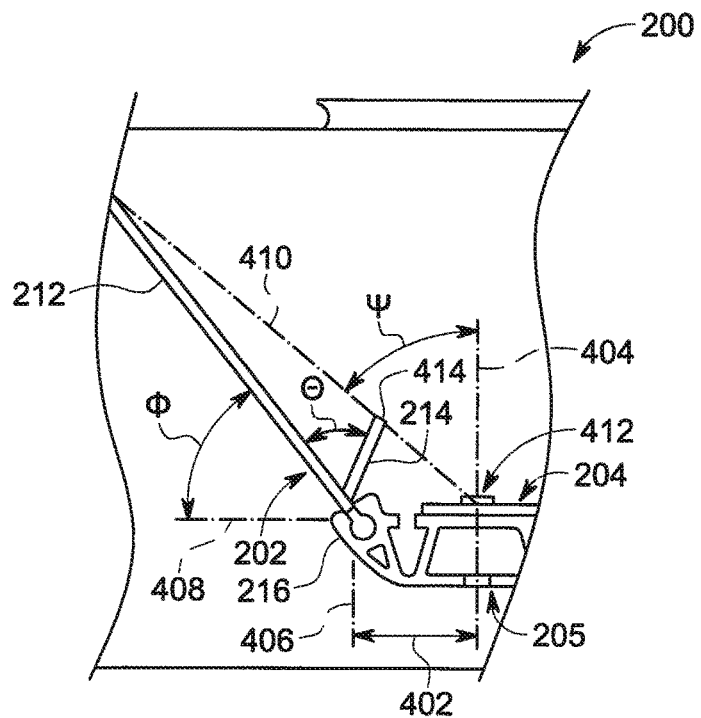
FIG. 4 is a closer view of a portion of the fixture shown in FIG. 3, indicating various intra-fixture parameters.

Lighting Fixture in Additional Detail—FIGS. 3 and 4

FIG. 3 shows a close-up side cut-away view of the light fixture 200 of FIG. 2. As provided, the diffuser apparatuses 202A, 202B of the fixture 200 can be secured in place in any of a wide variety of ways, including by the illustrated mount 216 receiving a first end of the diffuser apparatus 202A, 202B (e.g., a first end of a first panel 212) and a reflector-side receiving area 208 receiving a second end of the apparatus 202A, 202B (e.g., a second end of the first panel 212).

The mounts 216 are, in some embodiments, part of the light engine 204 and/or part of the heat sink 205. The mounts 216 shown each include two or more prongs 302, 304 between which the first end of the first diffuser panel 212 is held.

The diffuser apparatus 202A, 202B is shaped and sized, generally, to promote desired color mixing, before light rays are visible to users/consumers, preventing different colors being visible separately leaving the diffuser 202A, 202B and fixture 200—i.e., preventing colors (e.g., contrasting colors) from being visible in light emitting from the diffuser apparatus 200, or at least in light being emitted by the fixture 200.

In a particular embodiment, the diffuser apparatuses 202A, 202B are configured and arranged in the fixture so that a v-portion of each apparatus 202A, 202B, i.e., the portion of the apparatus where the two panels 212, 214 meet, is adjacent the light engine 204. These configurations and arrangements promote color mixing, thereby limiting color separation that would be present otherwise for light leaving the light engine or at least for some light—.e.g., light leaving the engine 204 at high angles, as described more below.

In some embodiments, configuration and arrangement of each diffuser apparatus 202A, 202B is set so that light rays leaving the light engine 204 at first predetermined trajectories will pass through one of the diffuser apparatuses 202A, B once, and light rays leaving the light engine 204 at second predetermined trajectories will pass through one of the diffuser apparatuses 202A, 202B twice—i.e., first through a first, smaller, part of the apparatus 202A, 202B (e.g., panel 212 in FIGS. 4 and 5) and then through a second, larger, part (214) of the apparatus 202A, 202E.

The smaller part 214 of the diffuser apparatus 202A, 202B will reduce the amount of light that is emitted from the light source—e.g., non-white LED at high angle without being properly mixed. The increased color mixing, by double exposure to the respective parts of the apparatus 202A, 202B, will prevent hot spots, or color spots, that would otherwise form, if there were no smaller part (214), form on the larger part (212) of the diffuser in connection with light arriving at the larger part from the light source, such as light leaving the source 204 at a relatively-high angle toward the large part 212.

Each apparatus 202A, 202B of these embodiments may be referred to as a double diffuser, a double diffuser apparatus, a double-paneled diffuser, a two-layer diffuser, a two-part diffuser, a double-sided diffuser, the like, or other. The double diffuser apparatuses 202A, B are arranged in the fixture 200 close to the light engine 204, e.g., adjacent to a non-white LED board.

The second pass of light through the apparatus 202A, 202B promotes additional color mixing for light rays needing additional diffusing, beyond the color mixing occasioned by the first pass.

Compare a diffuser apparatus (not shown) having only a single, e.g., flat, diffuser panel, by which light leaving the source (1) has undesirable color separation, being mixed insufficiently by the single pass, through the single panel, and there being no second panel through which the light would make a second pass to complete color mixing, and/or (2) has undesirable efficiency. Regarding color separation, for instance, in one example, a single diffuser having a relatively-low diffusivity, such as by having 85% transmission and 15% reflectance, was found to mix color undesirably. Regarding efficiency, in another example, a single diffuser having a relatively-high diffusivity, such as by having 50% transmission and 50% reflectance, had an undesirably low efficiency, such as by an at least 12% loss in efficiency.

Loss of efficiency of the double-diffuser—e.g., v-shaped, two part apparatus 202A, 202B shown—in some embodiments has been found to be as low as about 4%, and even about 3%, and could potentially be even lower depending on the configuration and arrangement of the diffuser apparatus 202A, 202B and fixture 200 generally.

In FIG. 3, example first trajectories according to which light passes once through the diffuser apparatuses are called out by reference numbers 10A, 10B. As shown, the first trajectories pass through an intermediate area 40 as the rays pass adjacent the apparatuses 202A, 202B.

Example second trajectories according to which light passes twice through the diffuser apparatuses are called out by reference numbers 20A, 20B.

The diffuser apparatuses 202A, 202B described herein are also configured and arranged within the fixture to enable maximum efficiency of light output for the fixture 200. Light rays leaving the light engine 204 (e.g., non-white LED source) at certain, third trajectories are the strongest rays emitted from the fixture 200 because they travel most directly to viewers and objects illuminated by the fixture 200.

At an example third trajectory light rays reflect back to light engine an depending on the reflectivity of light engine, will absorb or reflected back to reflector following one of the explained trajectory.

The light kept strong in not having to go through, and be weakened by, either layer of the diffuser apparatus 202A, 202B. Because most unwanted color separation occurs in connection with, light rays leaving the light engine 204 (e.g., non white ED source) at relatively higher angles, as mentioned, color mixing by the diffuse apparatuses 202A, B is not needed for light rays having the more-direct trajectories.

In these ways, the design ensures that light rays are diffused by the apparatuses 202A, B as needed (e.g., via one or two passes through the apparatus), but not more.

The desired light produced by light fixtures configured with the present diffuser arrangement also has a high luminous efficacy. Luminous efficacy can be measured in units of lumens Per watt (lm/W, or LPW). Luminous efficacy is a measure of how well a light source produces visible) light, and the overall luminous efficacy of a light fixture is a product of how well it converts energy to electromagnetic radiation and how well the emitted radiation is detected by the human eye. In some embodiments, luminous efficacy; of the light fixture 200 is another factor in configuring (e.g., size, shape, material) and arranging (positioning in the fixture) the diffuser apparatus 202A, 202B.

Other variables, considerations, or factors for configuring and arranging the diffuser apparatus 202A, 202B, such as intra-diffuser apparatus lengths and angles, include angular intensity of the light source (e.g., non-white LED). The considerations for configuring and arranging the diffuser apparatus 202A, 202B in one embodiment include a size or performance characteristic (e.g., thermal conductivity, thermal resistance) of heat sink 205. Still another example consideration for configuring and arranging the diffuser apparatus 202A, 202B is a distance between the heat sink heat 205 and the reflector 206.

FIG. 4 is a closer view still of the fixture 200, showing a portion of the fixture including a references to various intra-fixture parameters. More particularly, the figure shows one of the diffuser apparatus 202A, 202B, the light source 204, and the heat sink 205 of the fixture 200, and select distances and angles by which they arranged. The variables are provided to give context, or a perspective of magnitude to the fixture components. They are also provided to show example factors that can be changed in system design.

The distance called out include a distance 402 separating a centerline 404 of the fixture 200, or at least of the light source 204, and a first diffuser mount line 406—e.g., a bottom edge or point of contact between the lower mount 216 and the diffuser apparatus 202A, 202B. In one embodiment, the distance 402 is about 20 mm, or between 19 and 20 mm, or a few millimeters more or less. In a particular embodiment, the distance 402 is about 19.878 mm.

The angles called out in FIG. 4 also include a first angle $\theta$ between the first and second parts 212, 214 of the diffuser apparatus 202A, 202B. In one embodiment, the first angle $\theta$ is about 60°, or a few degrees greater or less than about 60°. The first angle $\theta$ can be much greater or smaller, as well, such as up to 90°, anywhere between 60° and 90°, or less than 60°, such as down to 60°, 45°, angles between these values, or even lower than these.

The angles called out in FIG. 4 also include a second angle φ by which the positioned first part 212 of the apparatus 202A, 202B is angled from a reference horizontal line 408 of the fixture 200. In one embodiment, the second angle φ is about 52°, or a few degrees greater or less than about 52°. The second angle φ can be much greater or smaller, as well, such as up to 60°, or 75°, anywhere between 50° and 75°, or more, or less than 50°, such as down to 45°, 40°, angles between these values, or even lower than these.

The angles called out in FIG. 4 also include a third angle Ψ separating a reference vertical line of the fixture 200, being said centerline 404, and a trajectory 410 extending between a reference point 412 of the light source 204, such as a center, or upper center, of the light source 204, and a clearance point 414, or just above the clearance point, of the second part 214 of the apparatus 202A, 202B. In one embodiment, the third angle Ψ is about 50°, or a few degrees greater or less than about 50°. The third angle Ψ can be much greater or smaller, as well, such as up to 60°, or 75°, anywhere between 50° and 75°, or more, or less than 50°, such as down to 45°, 40°, angles between these values, or even lower.

The third angle Ψ can be related in diffuser or apparatus design to, e.g., the light rays 10, 30 (FIG. 3) described above as passing on either side of said clearance point 414 (FIG. 4). Light (e.g., the first ray 10 in FIG. 3) would not impinge on the diffuser apparatus 202A, 202B (e.g., on the smaller part 214) if it leaves the light source at an angle smaller than (or equal to or small than, depending on how the third angle Ψ is set) the third angle Ψ, or smaller than a similar angle adjusted based on the point from which the light ray departs the source 204. Similarly, light (e.g., the second ray 30 FIG. 3) would not impinge on the diffuser apparatus 202A, 202B (e.g., on the smaller part 214) if it leaves the light source at an angle smaller than (or equal to or smaller than, depending on how the third angle Ψ is set) the third angle Ψ, or smaller than a similar angle adjusted based on the point from which the light ray departs the source 204. Other example spacing variables are described next in connection with FIGS. 5 and 6. As mentioned, all of these are example variables that can be set, with or without using a custom software package, in designing a diffuser apparatus, or aspects of the fixture 200 including the apparatus 202A, 202B, according to the present technology. The design process, including factors considered, is described more below.

Figure 5:
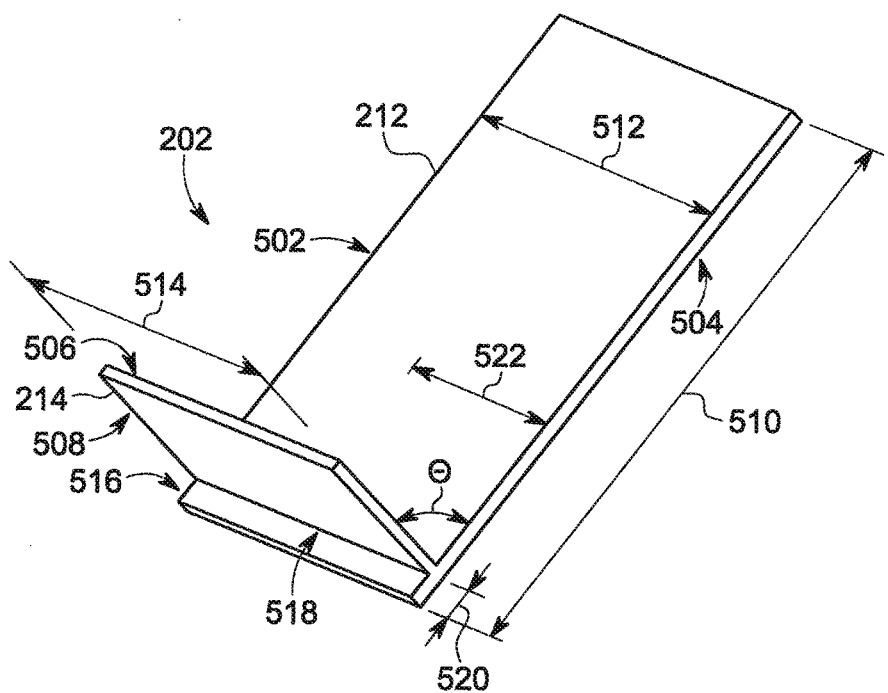
FIG. 5 is a perspective view of the diffuser apparatus.
Figure 6:
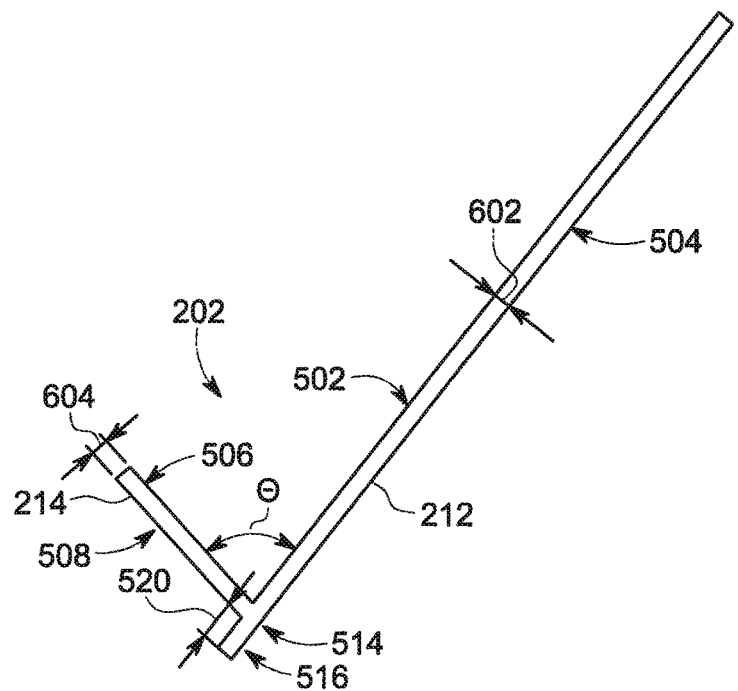
FIG. 6 is a side view of the diffuser apparatus of FIG. 5.

Diffuser Apparatus in Additional Detail—FIGS. 5 and 6

FIG. 5 is a perspective view of a generally v-shaped asymmetrical diffuser 202A, 202B for use in optical fixtures 200, as shown in FIGS. 2 and 3. FIG. 6 is a side view of the diffuser 202A, 202B.

As provided, the diffuser 202A, 202B includes a first portion, panel, or part 212 and a second portion, panel, or part 214. The first part 212 includes a first primary side or surface 502 opposite a second primary side or surface 504. The second part 214 includes a first primary side or surface 506 opposite a second primary surface 508. In the illustrated embodiment, the first part 212 is larger than the second part 214.

The parts 212, 214 can include any of a wide variety of diffractive materials without departing from the scope of the present technology. In one embodiment, the parts 212, 214 include the same material, and in another they include at least slightly differing diffractive materials. Example materials include glass, plastic, or another polymer. Example polymers include so-called photopolymer and polytetrafluoroethylene (PTFE).

The parts 212, 214 can have a variety of other configurations e.g., size, shape, and infra-diffuser-apparatus angles, without departing from the scope of the present disclosure. The part sizes and shapes, for instance, can be set depending on requirements of light output and consider characteristics of the source light. Example relevant angles are described above in connection with FIG. 4.

In the illustrated embodiment, the parts 212, 214 are shown connected. In a contemplated embodiment, the parts 212, 214 are spaced at least slightly apart. Even if the parts 212, 214 are connected directly, the apparatus 202A, 202B may include a gap in an area of connection, which could have benefits including, e.g., saving material, and so cost, and lowering fixture weight.

The angle θ separating the first and second parts 212, 214 is shown again in FIGS. 5 and 6 and can have any of a variety of values, as described more above and further below.

FIG. 5 also shows many diffuser size variables, including a length 510 of the diffuser 202A, 202B, and of the larger part 212. A width (depth) 512 of the diffuser 202A, 202B, and also, in the illustrated embodiment, of the larger part 214, is also shown. While a width of the smaller part 214 would be the same 512 in the illustrated embodiment, a separate width 514 indication is shown for the smaller part 512 considering that it can be different from the width 512 of the first part 212.

FIG. 5 also shows a lower portion 516 of the apparatus 202A, 202B extending below the smaller part 214—e.g., below a point or line 518 at which the larger and smaller parts 212, 214 meet. In one embodiment, the lower portion 516 is part of the larger part 212, such as by being formed integrally with the balance of the part 212. Another size variable shown is a height (or length) 520 of the lower portion 516.

The FIG. 5 also shows a depth 522 (or width) of the diffuser 202A, 202B, and of the smaller part 212.

In the profile, or side view of the diffuser apparatus 200 of FIG. 6, a thickness 602 of the first part 212, and a thickness 604 of the second part 214, are shown. The height 520 (or length) of the lower portion 516, and the intra-part angle θ, are also shown again in FIG. 6.

While an opposite embodiment is contemplated, in the illustrated embodiment, the second part 214 extends from the first part 212 in an inward direction of the fixture 200. More particularly, the second, smaller, part 214 of the first diffuser apparatus 202A is shown extending inward in FIGS. 2 and 3, the first apparatus 202A being located left of center in the view of the fixture 200 provided, and the second part 214 extending toward the right.

Similarly, the second, smaller, part 214 of the second diffuser apparatus 202B is shown extending inward in FIGS. 2 and 3, the second apparatus 202B being located right of center in the view of the fixture 200, and the second part 214 extending toward the left.

As referenced above the particular configuration (e.g., size, shape, material) and arrangement (intra-apparatus angles, intra-fixture positioning) of the apparatus 202A, 202B can be set, according to the teachings herein, by a designer of the apparatus 202A, 202B, or entire fixture 200, using one or more of a variety of variables, considerations, or factors.

The variables, considerations, or factors for setting the configuration an arrangement of the apparatus 202A 202B include lowering, e.g., minimizing, color separation, by increasing e.g., maximizing, color mixing.

The variables, considerations, or factors for setting the configuration and arrangement of the apparatus 202A, 202B include achieving a relatively low level of (e.g., minimizing) color separation, by causing a relatively high amount of (e.g., maximizing) color mixing.

In some embodiments, the apparatus 202A, 202B causes this benefit especially by modifying light departing the light source at one or more trajectories. The trajectories may include, e.g., lines at a relatively-high angle, as described above, including in connection with light rays 10, 20, 30 shown in FIG. 3.

Lower angle light—e.g., light emitted at a relatively high angle with respect to a vertical centerline (e.g., line 404 in FIG. 4) will pass through the diffuser once (e.g., through the first part 212 after reflection off of the reflective surface 208; see e.g., the first light ray trajectory 10), or without contacting the diffuser (see e.g., the second ray trajectory 20). Another manner to distinguish these trajectories 10, 20 is that those 10 having a sufficiently low angle will, pass through the extra-diffuser area 40 illustrated, while rays 20 that do not will pass through the smaller diffuser part 212.

Higher angle light will also not pass through the extra-diffuser area 40, and will also pass through the diffuser twice, as shown for the third example ray 30 in FIG. 3 and described more below.

As provide, variables, considerations, or factors for setting the configuration and arrangement of the apparatus 202A, 202B include achieving a relatively high (e.g., maximizing) fixture light output efficiency. This benefit can be achieved at least in part by a configuration and an arrangement allowing some portions of light leaving the source 204 to pass out of the fixture 200 without passing through the apparatus 202A, 202B. The third light trajectory 30 is an example of this more direct light.

The light along the third light trajectory 30 is the strongest emitted from the fixture 200 because they travel most directly to viewers and objects illuminated by the fixture 200. The light along the third light trajectory 30 is kept strong by not having to go through either layer of the diffuser apparatus 202A, 202B. And because most unwanted color separation occurs in connection with light rays leaving the light engine 204 at relatively higher angles, as mentioned, color mixing by the diffuser apparatuses 202A, B is not needed for light rays having the more-direct, lower-angle, trajectories.

The variables, considerations, or factors for setting the configuration and arrangement of the apparatus 202A, 202B include achieving a high luminous efficacy (e.g., lumens per watt (lm/W, or LPW)). And, as referenced, other considerations for configuring and arranging the diffuser apparatus 202A, 202B, such as intra-diffuser apparatus lengths and angles, include angular intensity of the light source e.g., non-white LED. The considerations for configuring and arranging the diffuser apparatus 202A, 202B in one embodiment include a size or performance characteristic (e.g., thermal conductivity, thermal resistance) of heat sink heat sink 205. Still another example consideration for configuring and arranging the diffuser apparatus 202A, 202B is a distance (not called out specifically) between the heat sink heat sink 205 and the reflector 106.

Figure 7:
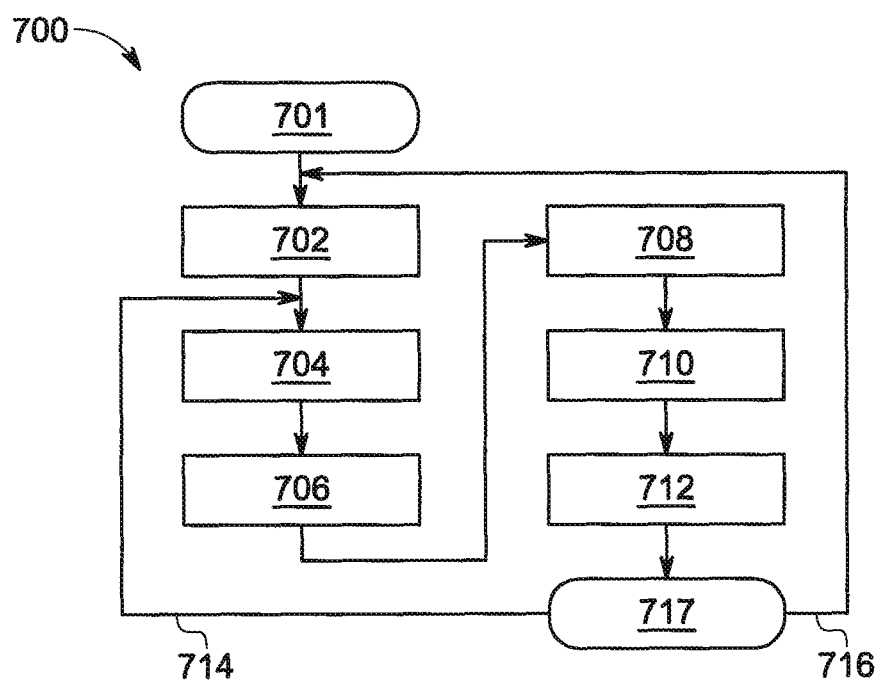
FIG. 7 illustrates schematically a process for designing a diffuser apparatus or lighting fixture according to embodiments of the present technology.

Methods of Manufacture—FIG. 7

The diffuser apparatuses 202A, 202B, and light fixtures 200 including them, according to the present technology can have any of a wide variety of configurations (e.g., size, shape, material) and arrangements (intra-apparatus angles, intra-fixture positioning).

As provided, a designer may consider any one or more of numerous factors described above. In one embodiment, one or more steps of apparatus, or fixture, design is performed by a computing device. The computing device can include a computer-readable storage medium, or device, for storing computer-executable code or instructions. The medium can be non-transitory and tangible, and the instructions can be referred to also as a software package—e.g., a custom light-diffuser software package.

A computer device is not shown in detail in the figures, and could be visualized schematically, such as by a common layout showing computer components by shapes, such as a cylinder to represent a memory, a block to represent a processor, a block within the cylinder to represent code or instructions stored in the memory, an elongated rectangle to show a bus along which computer components communicate, etc.

The instructions are configured to cause the processor, when executing the code, to perform one or more calculations for determining design at least one characteristic of a diffuser apparatus, and/or overall light fixture including it. The at least one characteristic can include any or all of those mentioned, including those related to the apparatus and fixture configurations (e.g., size, shape, material) and arrangements (intra-apparatus angles, intra-fixture positioning) mentioned.

The method can thus include designing, using a processor executing a software package, the aspects of the diffuser apparatus and/or the fixture with respect to (e.g., consideration given to) the diffuser apparatus of the present teachings.

In one embodiment, the methods of the present technology include making (e.g., designing and/or generating) all or aspects of the custom design software package. The custom design software package, whether obtained and/or made, is in some embodiments simulation software programmed with optics-related data for predicting of light output from the diffuser apparatus, and/or the light fixture, based on one or more inputs provided to the package.

Program inputs can include, for instance, any of the following: the type of light source used (e.g., non-white LED), characteristics of the light source (e.g., strength, initially-output color pattern(s); location within the fixture or with respect to the apparatus, etc.); and other intra-fixture positioning, such as information indicating relative locations of components such as the reflective surface, the light source, and the diffuser apparatus (e.g., distances and/or angles separating each of these).

Program inputs can also include any aspect of the configurations and arrangements of the diffuser apparatus and fixture, mentioned above, such as size, shape, material of the diffuser apparatus, and/or other fixture components, intra-diffuser-apparatus angles, intra-fixture positioning.

Program inputs can also include characteristics of desired output light, including desired characteristics of light (e.g., color, luminosity, etc.) to be output from the diffuser apparatus and/or from the overall fixture.

As mentioned, the software package is configured to, using any of these and/or similar pertinent inputs, determine, or recommend one or more desired design characteristic for the diffuser apparatus, or overall fixture. For instance, in one implementation, a recommended length (e.g., length 510 in FIG. 5) of the second apparatus part 214 is desired and, with various needed inputs being provided to the software package, the processor provides a recommended length. In another embodiment, the angle θ separating the parts 212, 214 of the diffuser apparatus 200 is determined or proposed by the processor executing the software package and relevant inputs thereto.

The package in some embodiments provides multiple pieces of related information, such as about the quality and strength of light that would be output according to a recommended or user-requested diffuser apparatus and/or fixture configuration. The software program and/or a designer of the system using the program may use information provided in an iteration of the package to determine whether and how (e.g., with what different input variables or assumptions) to re-perform operations—reference is made here to the related re-performance path indicated in FIG. 7 by numeral 714, and described further below.

Steps of the process match one or more algorithms, for performing various operations related to designing a diffuser apparatus 202A, 202B or aspects of a lighting fixture 200 to include the apparatus 202A, 202B.

Turning to the last figure, FIG. 7 shows schematically a process flow 700 representing one or more algorithms. Operations of the method 700 are not necessarily presented in any particular order and performance of some or all the steps in an alternative order is possible and is contemplated. The steps are presented in the demonstrated order for illustrative purposes. Steps can be added, omitted and/or performed simultaneously without departing from the scope of the appended claims. The illustrated method 700 could be ended at any time.

The method 700 begins 701 and flow proceeds to a first, and optional, block 702, whereat a software package is obtained for performing other aspects of the method 700. Obtaining the software package in some embodiments includes retrieving, or otherwise receiving, the package. In some embodiments, the step 702 includes making (e.g., designing and/or generating) the package, as referenced above.

From block 702, flow of the process 700 proceeds to block 704 whereat the processor, executing the software package, receives a triggering message requesting or instructing commencement of a relevant mode of package operations, such as a diffuser apparatus simulation, a light fixture simulation, a diffuser apparatus configuration recommendation mode, a fixture configuration recommendation mode. In one embodiment, the triggering message is initiated by a user—e.g., personnel using the computer system to design all or some aspects of the diffuser apparatus 202A, 202B and/or aspects of the overall light fixture 200 to include the diffuser apparatus 202A, 202B.

At optional block 706, the processor, executing the software package, initiates presenting to a user a request for input parameters, such as by presenting a screen, by way of a display device (e.g., computer monitor), allowing input of parameters.

At block 708, the processor, executing the software package, receives (e.g., by user input), or otherwise accesses or obtains, parameters for consideration in recommending or analyzing all or aspects of apparatus or fixture configuration and/or arrangement. The parameters can include any of the factors described above, such as desired light output characteristics, strength, color, or features of a given light source—e.g., non-white LED panel.

At block 710, the processor, executing the software package, processes all relevant input data. The processing can include, e.g., performing a simulation, using optical and other data of the package, to predict diffuser apparatus and/or light fixture performance.

At block 712, the processor provides an output. The output can be reached by processing including the previous step 710 or results of the previous step 710. The output can include the prediction(s) reached and/or related performance data generated.

The output can include, e.g., a recommendation of one or more apparatus or fixture characteristics for achieving at least one desired goal e.g., a measure of, or relating to, an amount of color mixing.

Outputting the data in this operation 712 can be performed in any of a variety of ways, such as by a pre-set output screen.

At transition oval 717, the processor can take any of a variety of courses. One option is to end the present process, such as automatically, or in response to user request. Another is to repeat one more operations, changing therein at least one of the inputs or package datum, as indicated by return path 714. While the illustrated path 714 is shown returning to the flow just after the first block 702, this is for illustrative purposes, as the re-performance 714 can start at any step or stage of the process 700, such as somewhere within the operations of the third block 704, after that block 704, etc.

The software package is in one embodiment configured to perform the re-performance 714 automatically, such as in response to determining that a desired result was not reached, that a better result is available or likely or may be available, or that one or more design factors (e.g., program output) is improper or less than desirable—e.g., by being above or below an allowed or desired threshold, outside of a specified range, or within an undesired range. The re-performance 714 can also be performed in response to user request.

The process can also be repeated, as indicated by return path 716, such as in connection with another diffuser apparatus or another light fixture altogether.

Illustrative Benefits and Advantages

The present technology allows manufacture of light fixtures outputting light of desired high quality. The high quality includes light having desired color mixing. In contrast, many conventional lighting arrangements provide light having large amounts of unwanted color separation.

For embodiments, in which soft clear or white light is desired, for instance, the present fixtures, including one or more light diffusers, configured and arranged according to the present technology, promote targeted color mixing, such as in connection especially with light leaving an LED source at high angles, to produce the light quality desired.

As referenced, in some implementations, a non-white LED light source is used, such as a blue-shifted yellow plus red (BSY+R) LED light engine, and the present diffuser arrangement allows output of soft clear or white light. And in some embodiments, one or more light fixture designs configured and arranged for a first type of light source, such as a white-light source, can be reconfigured to include the present diffuser apparatus easily (e.g., with minimum or substantially no other changes to the fixture) and thereby to accommodate a non-white LED light source, such as a BSY+R LED light engine and to produce desired high-quality light.

The desired light produced by light fixtures having installed therein the present diffuser arrangement also has a high luminous efficacy. Luminous efficacy can be measured in units of lumens per watt (lm/W, or LPW). As provided, luminous efficacy is a measure of how well a light source produces visible light, and the overall luminous efficacy of a light fixture is a product of how well it converts energy to electromagnetic radiation and how well the emitted radiation is detected by a viewer.

The present technology also includes methods of designing a diffuser apparatus, or light fixture including the apparatus, based on one or more of numerous input variables. In one embodiment, the methods include at least one operation performed by a processor executing a custom software package.

The technology also, in some embodiments, includes a retrofitting process by which the desired light diffuser apparatus is achieved by adding a new diffuser part (e.g., panel 214) to an existing diffuser part (e.g., panel 212) and/or using existing fixture features. These approaches could save cost by using existing material and infrastructure.

VI. CONCLUSION

Those skilled in the art, particularly in light of the foregoing teachings, may make alternative embodiments, examples, and modifications that would still be encompassed by the technology. Further, it should be understood that the terminology used to describe the technology is intended to be in the nature of words of description rather than of limitation.

Those skilled in the art will also appreciate that various adaptations and modifications of the preferred and alternative embodiments described above can be configured without departing from the scope and spirit of the technology. Therefore, it is to be understood that, within the scope of the appended claims, the invention may be practiced other than as specifically described herein.

We claim:

1. An optical diffuser apparatus, for use adjacent a light engine in a lighting fixture for producing desired color-mixed light output, comprising:
   a first diffuser panel; and
   a second diffuser panel connected to the first diffuser panel;
   wherein the first diffuser panel includes a first end and a second end, and the second diffuser panel, in being connected to the first diffuser panel, is connected to the first diffuser panel at a portion of the first diffuser panel that is intermediate the first end and the second end of the first diffuser panel;
   wherein the first diffuser panel and the second diffuser panel are configured and arranged so that, when the apparatus is positioned for operation within the fixture, light emitted by the light engine at greater than a pre-determined threshold angle with respect to a centerline of the engine will pass through both the first diffuser panel and the second diffuser panel, thereby mixing colors of the light toward the desired color-mixed light output.

2. The optical diffuser apparatus of claim 1, wherein the first diffuser panel and the second diffuser panel, in being connected, form an asymmetrical shape.

3. The optical diffuser apparatus of claim 1, wherein the first diffuser panel and the second diffuser panel, in being connected, form generally a v-shape.

4. The optical diffuser apparatus of claim 3, wherein the first diffuser panel and the second diffuser panel, in being connected, form generally an asymmetrical v-shape.

5. The optical diffuser apparatus of claim 1, wherein the first diffuser panel and the second diffuser panel, in being configured and arranged so that light emitted by the light engine at greater than a pre-determined angle will pass through both the first diffuser panel and the second diffuser panel thereby mixing colors of the light toward the desired color-mixed light output, are configured and arranged to form a pre-established panel-separation angle.

6. The optical diffuser apparatus of claim 5, wherein the pre-established panel separation angle is between about 50° and about 65°.

7. The optical diffuser apparatus of claim 1, wherein the pre-determined threshold angle is between about 45° and about 55°.

8. The optical diffuser apparatus of claim 1, wherein the light engine includes a light-emitting diode device.

9. The optical diffuser apparatus of claim 8, wherein the light-emitting diode (LED) device includes a non-white LED light board.

10. The optical diffuser apparatus of claim 8, wherein the light-emitting diode (LED) device is a blue-shifted-yellow plus red (BSY-R) LED device.

11. The optical diffuser apparatus of claim 1, wherein the portion of the first diffuser panel, which is intermediate the first end and the second end of the first diffuser panel, is adjacent the first end of the first diffuser panel and remote to the second end of the first diffuser panel.

12. A lighting fixture, comprising:
    a light engine; and
    two diffuser apparatuses positioned adjacent the light engine for modifying light toward a desired color-mixed light output, each diffuser apparatus comprising:
    a first diffuser panel; and
    a second diffuser panel connected to the first diffuser panel;
    wherein the first diffuser panel and the second diffuser panel are configured and arranged so that light emitted by the light engine at greater than a pre-determined threshold angle with respect to a centerline of the engine will pass through both the first diffuser panel and the second diffuser panel, thereby mixing colors of the light toward the desired color-mixed light output;
    wherein the pre-determined threshold angle is a first pre-determined threshold angle, and the diffuser apparatus and a balance of the fixture are configured and arranged so that light emitted from the light engine at less than a second pre-determined threshold angle will not pass through either the first diffuser panel or the second diffuser panel of either of the two diffuser apparatuses.

13. The lighting fixture of claim 12, further comprising a mount connected to the light engine and configured to receive the first diffuser panel of each diffuser apparatus, wherein the mount is part of or connected to a heat sink that is in turn connected to the light engine.

14. The lighting fixture of claim 12, further comprising a reflector, wherein the reflector and the diffuser arrangement are configured and arranged so that the reflector receives an end of each first diffuser panel and reflects light received from the light engine to be emitted from the fixture.

15. The lighting fixture of claim 12, wherein the pre-determined threshold angle is a first pre-determined threshold angle, and the diffuser apparatus and a balance of the fixture are configured and arranged so that light emitted from the light engine at less than the first pre-determined threshold and greater than a second pre-determined threshold angle will pass through one of the diffuser apparatuses once by passing through only the first diffuser panel of the one diffuser apparatus.

16. The lighting fixture of claim 12, wherein the first diffuser panel and the second diffuser panel, in being connected, form generally an asymmetrical v-shape.

17. The lighting fixture of claim 12, wherein the light engine includes a non-white light emitting diode device.

* * * * *